United States Patent Office 3,304,328
Patented Feb. 14, 1967

3,304,328
PREPARATION OF ACETOACETARYLAMIDES
Ralph L. Pelley, Linthicum Heights, Md., assignor to FMC Corporation, New York, N.Y., a corporation of Delaware
No Drawing. Filed Oct. 25, 1963, Ser. No. 318,820
6 Claims. (Cl. 260—562)

This invention relates to the preparation of acetoacetarylamides and more particularly to an improved method of preparing acetoacetarylamides in aqueous medium.

Acetoacetarylamides are of commercial interest to the dye industry in the preparation of yellow pigments which are used in paints and printing inks. These pigments are prepared by reacting the acetoacetarylamide with caustic to form the amide salt and then reacting this salt with a diazonium compound. Such pigments are prepared in batches with a great effort at reproducing the shade and strength of the pigment to match established standards. To achieve these standards, the acetoacetarylamide must meet stringent purity requirements. Impurities must be less than about 1.0%, and preferably less than about 0.2%, if high quality pigments are to be prepared.

In U.S. Patent No. 1,982,675, Law teaches the preparation of acetoacetanilide by reaction of diketene and aniline in toluene as a solvent. In order to recover a maximum yield of product, the reaction mixture is cooled to 20° C. to recover a first crop of acetoacetanilide crystals. A second crop of crystals is obtained by cooling to —5° C. The remaining liquor is then evaporated to a low volume and cooled to 0° C. to give a third crop of impure crystals. This crop is then purified with caustic to remove the large amount of insoluble impurities.

In U.S. Patent No. 2,152,132 to Boese, a process of preparing acetoacetarylamides by reacting arylamines with diketene in aqueous dispersion is described. The best yield reported by this patent is 86% (Example 2), and the product contained a small amount of caustic insoluble material which had to be removed by treatment with caustic and filtration.

Thus in each of the prior art processes a purification step is necessary to provide acetoacetarylamides of sufficient purity to be used in the preparation of pigments. It would be advantageous to provide a process for preparing acetoacetarylamides in high yield and of sufficient purity that no subsequent purification step is necessary. Heretofore, no such process has been developed.

It is an object of this invention to provide a process for preparing acetoacetarylamides in high yield and of sufficient purity that no subsequent purification is necessary.

Another object is to provide a method of directly preparing acetoacetarylamides in yields of at least about 90% and purities in excess of 99%.

These and other objects will become apparent from the following description of this invention.

I have now discovered an improved method of preparing acetoacetarylamides which comprises reacting a primary amine selected from the group consisting of arylamines and aryldiamines in which the amino groups are attached directly to the aromatic carbocyclic nuclei with diketene in aqueous medium with agitation at a temperature of about 0–50° C. by simultaneously adding the two reactants in substantially stoichiometric proportions at a rate sufficiently slow to avoid any substantial build-up of reactants in the presence of 1–10 parts by weight of water for each part of total reactants while agitating with a force of at least 0.5 horsepower per 100 gallons of reaction medium. When the reactants are simultaneously added in substantially stoichiometric proportions, quite surprisingly, yields of at least about 90%, and preferably at least 95%, of product assaying greater than 99% purity and completely soluble in cold, aqueous caustic are obtained directly without purification.

Acetoacetarylamides are prepared in accordance with this invention by reacting a primary arylamine or aryldiamine with diketene in the presence of water in accordance with the following equations:

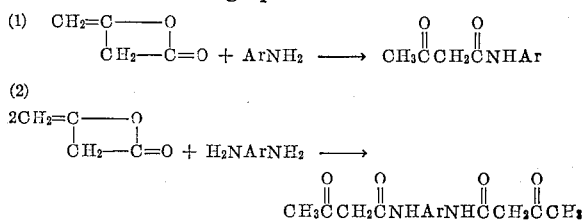

All of the reactants and the reaction products are insoluble in the aqueous medium. Therefore, it is necessary to provide a sufficient degree of agitation to disperse the insoluble reactants in the water in a fine state of subdivision.

The arylamine and diketene should be reacted in substantially stoichiometric proportions. A small excess of diketene, corresponding to about 1–3 mole percent, may be used, if desired. Thus, about 0.95–1.05 equivalents of diketene should be charge for each equivalent of arylamine, and preferably about 1–1.03 equivalents. One mole of diketene is equivalent to one mole of monoamine, or 0.5 mole of diamine.

The arylamine and diketene should be charged to the reactor at a rate sufficiently slow to avoid any substantial build-up of reactants. In other words, the reactants should not be charged to the reactor all at once. The optimum rate of addition will vary depending on such factors as reaction temperature, amount of water present, and the base strength of the amine. In a batch operation involving arylamines having a base strength greater than $10^{-13}$, the reactants should be added evenly over a period of at least about 15 minutes, and preferably about 30–60 minutes. In this manner, the reactants are added at substantially the rate at which they react.

For best results, diketene of about 90% purity or better should be used. The diketene can be used as a solution in a solvent such as acetone, if desired.

The primary amines which are suitable for the improved process of this invention are arylamines and aryldiamines in which the amino groups are attached directly to the aromatic carbocyclic nuclei. Typical examples of such amines include aniline, alkarylamines such as toluidine, dimethylaniline and diethylaniline, haloarylamines such as chloroaniline and bromoaniline, alkhaloarylamines such as chlorodimethylaniline and chlorodiethylaniline, alkoxyarylamines such as anisidine and dimethoxyaniline, aromatic substituted arylamines such as aminodiphenyl, naphthylamine and aminoanthraquinones, amidoarylamines such as aminobenzamide, diamines such as phenylenediamine, alkaryldiamines such as tolylenediamine, and diaryldiamines such as benzidine, tolylidine, dichlorobenzidine and dimethoxybenzidine, as well as many others. The amine may be liquid, solid or molten.

The amount of water used in this reaction should be controlled within specific limits to provide good yields and product quality. Since the reactants and product are both essentially insoluble in water, the aqueous medium functions to lend mobility to the reactants, to dissipate the heat of reaction, and to dissolve impurities such as traces of acetic acid. A practical concentration range for water is one in which the reactants are sufficiently mobile to affect good mixing, but not so dilute as to cause material product loss through solubility. A suitable range is about 1–10 parts of water per part of total reactants, and preferably about 3–4 parts. The appropriate amount of water may be charged to the reactor simultaneously with the reactants, or prior to the addition of the reactants. The amount of water specified corresponds to the total amount of reactants charged rather than the amount of reactants actually present at any particular time.

The arylamine reacts with diketene under relatively mild conditions. Excessive temperatures should be avoided since they promote hydrolysis of diketene. The reaction should be conducted at temperatures of about 0–50° C., and preferably about 20–30° C. The most practical pressure for conducting this reaction is atmospheric, although pressures above or below atmospheric may be employed, if desired.

As previously stated, it is necessary that sufficient agitation be provided to finely disperse the two reactants in the water, thus promoting their reaction while decreasing the formation of undesirable by-products. In order to achieve the improved results of this invention, it is necessary to agitate with a force of at least about 0.5 horsepower per 100 gallons of reaction medium, and preferably at least about 2 horsepower per 100 gallons. The horsepower requirement refers to the force actually delivered to the agitator blade. The rate at which the reaction takes place is controlled primarily by the basicity of the arylamine. For amines having a basic strength of greater than about $10^{-13}$, the reaction will take about 20–90 minutes for completion.

The arylamine and diketene can be fed into the reaction zone by a number of convenient methods, such as through open conduits or spray jets above the surface of the reaction medium, or through dip legs below the surface of the medium. Solid arylamines can be metered through screw conveyers or introduced as a fine slurry in water.

The process can be operated either as a batch process in which the product is removed batch-wise, or as a continuous process in which the product slurry is removed continuously. Suitable equipment for efficient use of reactants in a continuous process includes a series of two or more cascade reactors or a progressing line reactor.

The arylide product is readily recovered from the reaction medium by filtration. If desired, the filter cake may be washed with water to remove trace amounts of acetic acid, arylamine and diketene, although it is not absolutely necessary. The filter cake can then be dried in an oven to remove the remaining moisture. An important distinction between this invention and prior aqueous processes is the ability to generate an arylide of such purity that there is no side reaction by-product. When operating in accordance with this invention, the prior art steps of (1) converting the arylide to the water soluble sodium salt, (2) filtering to remove water insoluble impurities and (3) acidifying to regenerate the free arylide are not necessary.

The following examples, illustrating the improved method of preparing acetoacetarylamides of this invention, are presented without any intention that the invention be limited thereto. All parts and percentages are by weight.

*Example 1*

Acetoacetanilide was prepared as follows: Diketene (895 parts, 96% pure) and 930 parts of aniline having an APHA color of 70 were simultaneously added over a 30-min. period to 5000 parts of water which was thoroughly agitated and held at 25° C. The agitation was continued for an additional 90 min. after addition of the reactants was completed. The medium was then cooled to 10° C. and the product was recovered by filtration. The equipment was rinsed with 1000 parts of cold water and the washings were added to the filter cake. After drying the product in a vacuum oven at 60° C., there was obtained 1720 parts (97.3% yield) of white crystalline acetoacetanilide, melting at 83–84° C. and assaying 99.4% pure. A 1-part sample dissolved completely in 10 parts of 5% caustic to give a clear water white solution.

For comparison, this example was repeated except that all of the aniline was charged to the reaction initially with the water, and the diketene was added slowly over a 30-min. period. Sixteen hundred parts of dry product were recovered, corresponding to a 90.3% yield. When a 1-part sample was mixed with 10 parts of 5% caustic, a large amount of insoluble yellow material was present.

*Example 2*

Acetoacet-ortho-toluidide was prepared as follows: The process of Example 1 was repeated except that 1074 parts of ortho-toluidine was added simultaneously at a molar equivalent rate with the 895 parts of diketene. Acetoacet-ortho-toluidide, melting at 105–7° C. and assaying 99.7% pure, was obtained in 98% yield. A 1-part sample of the product was completely soluble in 10 parts of 5% aqueous caustic.

*Example 3*

Acetoacetanilide was prepared by a continuous process as follows: To a reactor equipped with a stirrer and external cooling, 166 parts of water, 31 parts of aniline, and 29 parts of diketene were fed continuously per minute while maintaining the temperature at 25–30° C. When the reactor was 80% full, a stream of the reaction slurry was drawn off into a reactor 10 times larger at a rate sufficient to maintain a constant level in the first reactor. The medium in the second reactor was maintained at a temperature of 10° C., and after attaining a level corresponding to about ⅔ full, the reaction mixture was drawn off intermittently to maintain a level of 60–80% full. By means of a continuous analytical monitor, adjustments in the relative flow rates of the diketene and aniline were made to maintain the diketene at a 0–1% stoichiometric excess over aniline. In this manner pure acetoacetanilide was obtained, corresponding to over 95% of the aniline introduced. After filtering and drying, the acetoacetanilide was a pure white powder, completely soluble in dilute aqueous caustic.

*Example 4*

Acetoacet-ortho-chloroanilide was prepared as follows: To a flask equipped with a stirrer and external cooling were charged 4000 parts of water, 0.8 part of triphenyl phosphine, and 0.8 part of triethylenediamine. Ortho-chloroaniline (1275 parts) and 895 parts of 96.8% diketene were simultaneously metered in over a 2-hr. period. Stirring was continued for an additional 2 hrs. while maintaining a temperature of 20° C. After filtration and drying, 1875 parts of caustic-soluble acetoacet-ortho-chloroanilide, melting point 105–6° C., were obtained, corresponding to a 93.5% yield. The purity of this material was 99.8%.

*Example 5*

Acetoacet-ortho-toluidide was prepared as follows: A reactor equipped with a 4-baffle cage and a turbine stirrer having 6 blades was charged with 1500 parts of water. Ortho-toluidine (321 parts) and 261 parts of 96.8% diketene were simultaneously fed in over a 30-min. period while maintaining a stirring speed of 700 r.p.m. The stirring was continued for an additional 45 min., after which the product was filtered and dried to give 531 parts (93% yield based on ortho-toluidine) of completely caustic-soluble acetoacet-ortho-toluidide having a purity in excess of 99%.

*Example 6*

Acetoacetanilide was prepared as follows: Water (1300 parts) was charged to a kettle equipped with a stirrer and cooled to 10° C. Aniline (232 parts) and 212 parts of 99% diketene were metered simultaneously into the water at essentially equimolar rates, while stirring with a force of 1.2 horsepower per 100 gallons and maintaining the temperature below 30° C. Stirring was continued for an additional 40 min. beyond the time necessary to complete the addition. The mixture was then cooled to 10° C., filtered, and the filter cake was washed with 200 parts of water. After drying the white crystalline product, acetoacetanilide was obtained in 95% yield. A 1-part sample of the product was completely soluble in 10 parts of 5% aqueous caustic.

*Example 7*

Acetoacet-ortho-anisidide was prepared as follows: To a reactor equipped with a turbine stirrer were charged 500 parts of water, 0.02 part of triphenyl phosphine, and 0.1 part of N,N-dimethylaniline. Diketene (90 parts, 95.6% pure) and 123 parts of ortho-anisidine were simultaneously fed through separate lines into the stirred water at equimolar rates over a 45-min. period. The reactants entered the solution through dip tubes terminating at the periphery of the turbine and diametrically opposed to each other. The temperature was maintained at 20° C. by means of external cooling. After completion of the addition, stirring was continued for an additional hour. The product slurry was then cooled to 10° C. and filtered. After drying, there was obtained 192 parts of white acetoacet-ortho-anisidide, corresponding to 93% of the theoretical yield and having a purity of 99.5%. A sample of this material dissolved completely in cold 5% aqueous caustic.

*Example 8*

Bis(acetoacetyl) tolylenediamine was prepared as follows: A solution containing 61 parts of 2,4-tolylenediamine in 100 parts of water was slowly added to a stirred reactor containing 400 parts of water over a 30-min. period. Concurrent with the addition of the amine, and at a stoichiometrically equivalent rate, 89 parts of 96% diketene was added while maintaining a temperature of 30° C. After stirring for an additional 40 min., the product was filtered and dried to a 90% yield of N,N'-bis-(acetoacetyl) 2,4-tolylenediamine having a melting point of 120° C. The product was completely soluble in 5% caustic solution.

*Example 9*

Bis(acetoacetyl) meta-phenylenediamine was prepared as follows: The procedure of Example 8 was repeated except that a solution containing 54 parts of meta-phenylenediamine in 100 parts of water was used. There was obtained 129 parts of N,N'-bis(acetoacetyl) meta-phenylenediamine having a melting point of 120-121° C., corresponding to a 93.5% yield. The product was completely soluble in 5% caustic.

As will be apparent to those skilled in the art, numerous modifications and variations of the embodiments illustrated above may be made without departing from the spirit of the invention or the scope of the following claims.

I claim:

1. In the process of preparing acetoacetarylamides by reacting a primary amine selected from the group consisting of arylamines and aryldiamines in which the amino groups are attached directly to the aromatic carbocyclic nuclei with diketene in aqueous medium with agitation at a temperature of 0–50° C., the improvement which comprises simultaneously adding the two reactants in substantially stoichiometric proportions at substantially the rate at which they react whereby any substantial build-up of reactants is avoided in the presence of 1–10 parts by weight of water for each part of total reactants while agitating with a force of at least 0.5 horsepower per 100 gallons of reaction medium, whereby the product is produced in high yields of at least about 90% and is completely soluble in cold aqueous caustic without purification.

2. The improved process of claim 1 in which 1–1.03 equivalents of diketene are simultaneously added with each equivalent of amine in the presence of 3–4 parts by weight of water for each part of total reactants at a temperature of 20–30° C. while agitating with a force of at least 2 horsepower per 100 gallons of reaction medium.

3. The improved process of claim 2 in which the amine is aniline.

4. The improved process of claim 2 in which amine is ortho-toluidine.

5. The improved process of claim 2 in which the amine is ortho-chloroaniline.

6. The improved process of claim 2 in which the amine is ortho-anisidine.

References Cited by the Examiner

UNITED STATES PATENTS

| | | | |
|---|---|---|---|
| 1,982,675 | 12/1934 | Law | 260—562 |
| 2,115,413 | 4/1938 | Dahlen et al. | 260—562 |
| 2,152,132 | 3/1939 | Boese et al. | 260—562 |
| 2,152,786 | 4/1939 | Boese et al. | 260—562 |
| 2,174,239 | 9/1939 | Gleason | 260—562 |
| 2,776,672 | 9/1954 | Laemmle et al. | 260—247 |

WALTER A. MODANCE, *Primary Examiner.*

N. TROUSOF, *Assistant Examiner.*